(12) United States Patent
Newbold, Jr.

(10) Patent No.: US 6,872,885 B1
(45) Date of Patent: Mar. 29, 2005

(54) RECESSED ELECTRICAL FIXTURE ASSEMBLY WITH INSULATION BARRIER AND METHOD OF USING THE SAME

(75) Inventor: Ronald C. Newbold, Jr., Roebuck, SC (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/743,543

(22) Filed: Dec. 23, 2003

(51) Int. Cl.$^7$ ................................................. H01R 4/00
(52) U.S. Cl. ........................... 174/58; 174/60; 174/64; 248/906; 361/600
(58) Field of Search .............................. 179/58, 60, 64; 220/4.02, 3.92, 3.2, 3.7; 439/535; 248/906; 362/150, 365, 147, 148; 361/600; 52/220.1

(56) References Cited

U.S. PATENT DOCUMENTS

| | | |
|---|---|---|
| 3,104,833 A | 9/1963 | Stuart et al. |
| 4,093,818 A | 6/1978 | Thwaites et al. |
| 4,210,070 A | 7/1980 | Tatum et al. |
| 4,237,671 A | 12/1980 | Munson |
| 4,276,332 A | 6/1981 | Castle |
| 4,375,142 A | 3/1983 | McDonald |
| 4,400,673 A | 8/1983 | Gilman |
| 4,400,766 A | 8/1983 | Munson |
| 4,574,454 A | 3/1986 | Dyson |
| 4,751,624 A | 6/1988 | Russo et al. |
| 4,930,054 A | 5/1990 | Krebs |
| 5,034,859 A | 7/1991 | Gawad et al. |
| 5,222,800 A | 6/1993 | Chan et al. |
| 5,351,448 A | 10/1994 | Gohlke et al. |
| 5,373,431 A | 12/1994 | Hayman et al. |
| 5,404,687 A | 4/1995 | Blake et al. |
| 5,457,617 A | 10/1995 | Chan et al. |
| 5,470,471 A | 11/1995 | Luthi et al. |
| 5,546,711 A | 8/1996 | Heller |
| 5,548,499 A | 8/1996 | Zadeh |
| 5,562,343 A | 10/1996 | Chan et al. |
| 5,567,041 A | 10/1996 | Slocum |
| 5,588,737 A | 12/1996 | Kusmer |
| 5,823,664 A | 10/1998 | Demshki, Jr. et al. |
| 6,079,856 A | 6/2000 | Prestier |
| 6,082,878 A | 7/2000 | Doubek et al. |
| 6,105,334 A | 8/2000 | Monson et al. |
| 6,123,435 A | 9/2000 | Wang |
| 6,123,438 A | 9/2000 | Hentz |
| 6,176,599 B1 | 1/2001 | Farzen |
| 6,218,613 B1 * | 4/2001 | Justiniano et al. ............. 174/50 |
| 6,239,365 B1 * | 5/2001 | McEvers ....................... 174/50 |
| 6,286,980 B1 | 9/2001 | Meyer |
| 6,357,891 B1 | 3/2002 | Newbold et al. |
| 6,474,846 B1 | 11/2002 | Kelmelis et al. |
| 6,657,123 B2 * | 12/2003 | Moore .......................... 174/50 |
| 2002/0157324 A1 | 10/2002 | Newbold et al. |

OTHER PUBLICATIONS

Progress Lighting; firebox® The Recessed Downlighting Solution for Fire Rated Ceilings; Recessed Lighting, Apr. 2003, p. 36, no date.

Progress Lighting; P8585–01 Goof Ring, O.D. 8–7/8", for use with any recessed trim with a 7–3/4" O.D., Recessed Lighting, Apr. 2003, p. 60, no date.

Progress Lighting; P8012–Kit, retrofit kit for P8012 decorative recessed trims to fit into Juno and Halo housings, Recessed Lighting, Apr. 2003. p. 60, no date.

* cited by examiner

*Primary Examiner*—Dhiru R. Patel
(74) *Attorney, Agent, or Firm*—Michael E. Stimson; Mark S. Bicks; Alfred N. Goodman

(57) ABSTRACT

A recessed electrical fixture assembly that includes first and second support members that are spaced and substantially parallel, and include first and second opposing inner surfaces, respectfully. A barrier is releasably coupled to the first and second inner surfaces of the first and second support members to define an enclosure with at least one open side. A fire resistant housing is at least partially received in the enclosure defined by the barrier and is releasably coupled to the first and second support members. The fire resistant housing includes an opening corresponding to the open side of the enclosure and an electrical unit is received in the fire resistant housing.

36 Claims, 4 Drawing Sheets

US 6,872,885 B1

RECESSED ELECTRICAL FIXTURE ASSEMBLY WITH INSULATION BARRIER AND METHOD OF USING THE SAME

FIELD OF THE INVENTION

The present invention generally relates to recessed electrical fixture assemblies with insulation barriers for mounting in insulated ceilings or walls. More specifically, the present invention relates to a barrier for the assembly that provides sufficient spacing between the electrical fixture, particularly those fixtures not rated for insulation contact, and the insulation to avoid a fire hazard.

BACKGROUND OF THE INVENTION

Recessed electrical fixtures, such as downlights, particularly those with high wattage lamps or fixtures not rated for insulation contact, are required by UL (Underwriters Laboratory Inc.) standards to be sufficiently spaced from any insulation to prevent overheating of the fixture which may create a fire hazard. For example, the use of conventional high wattage recessed electrical fixtures in insulated ceilings or walls is often limited and/or difficult due to this insulation spacing requirement. Modifying the ceiling or wall structure or the recessed electrical fixture itself to meet UL standards is also often impractical and expensive.

Examples of conventional recessed electrical fixtures include U.S. Pat. Nos. 6,357,891 to Newbold et al., 6,105,334 to Monson et al., 4,440,766 to Munson, 4,237,671 to Munson, and 4,375,142 to McDonald and U.S. Patent Application Publication 2002/0157324 to Newbold et al., the subject matter of each of which is hereby incorporated by reference.

SUMMARY OF THE INVENTION

Accordingly, an object of the present invention is to provide a recessed electrical fixture assembly with an insulation barrier that can be mounted in insulated ceilings or walls and avoid overheating.

Another object of the present invention is to provide a recessed electrical fixture assembly with an insulation barrier that is easy to install in ceilings or walls.

Yet another object of the present invention is to provide a recessed electrical fixture assembly with an insulation barrier that requires no modifications to meet UL heat dissipation requirements for recessed fixtures mounted in insulated ceilings or walls.

The foregoing objects are basically attained by a recessed electrical fixture assembly including first and second support members, the first and second support members are spaced and substantially parallel, and include first and second inner surfaces, respectfully, the first and second inner surfaces oppose one another; a barrier is releasably coupled to the first and second inner surfaces of the first and second support members and defining an enclosure with at least one open side; a fire resistant housing is at least partially received in the enclosure defined by the barrier and releasably coupled to the first and second support members, the fire resistant housing includes an opening corresponding to the open side of said enclosure; and an electrical unit is received in the fire resistant housing.

The foregoing objects are also attained by a recessed electrical fixture assembly, including first and second support members, the first and second support members being spaced and substantially parallel, and including first and second inner surfaces, respectfully, the first and second inner surfaces opposing one another; a barrier including first, second and third foldable panels extending between the first and second support members, each of the foldable panels includes first and second foldable end flaps, and each of the first foldable end flaps being releasably coupled to the first inner surface of the first support member and each of the second foldable end flaps being releasably coupled to the second inner surface of the second support member, the first, second and third panels and the first and second inner surfaces of the first and second support members defining an enclosure with at least one open side; a housing at least partially received in the enclosure and releasably coupled to the first and second support members, the housing including an opening corresponding to the open side of the enclosure; and an electrical unit received in the housing.

The foregoing objects are also attained by a method of installing a recessed electrical fixture, comprising the steps of positioning a barrier between first and second support members, the first and second support members being spaced and substantially parallel with respect to one another and defining opposing inner surfaces; releasably coupling the barrier to each of the inner surfaces of the first and second support members, thereby defining an enclosure with at least one side being open; inserting a fire resistance housing for supporting a electrical unit into the enclosure through the open side of the barrier; and releasably coupling the housing to the first and second support members.

Other objects, advantages and salient features of the invention will become apparent from the following detailed description, which, taken in conjunction with annexed drawings, discloses preferred embodiments of the present invention.

BRIEF DESCRIPTION OF THE DRAWING

Referring to the drawings which form a part of this disclosure.

DETAILED DESCRIPTION OF THE INVENTION

Embodiment of FIGS. 1–5

Figure 1:
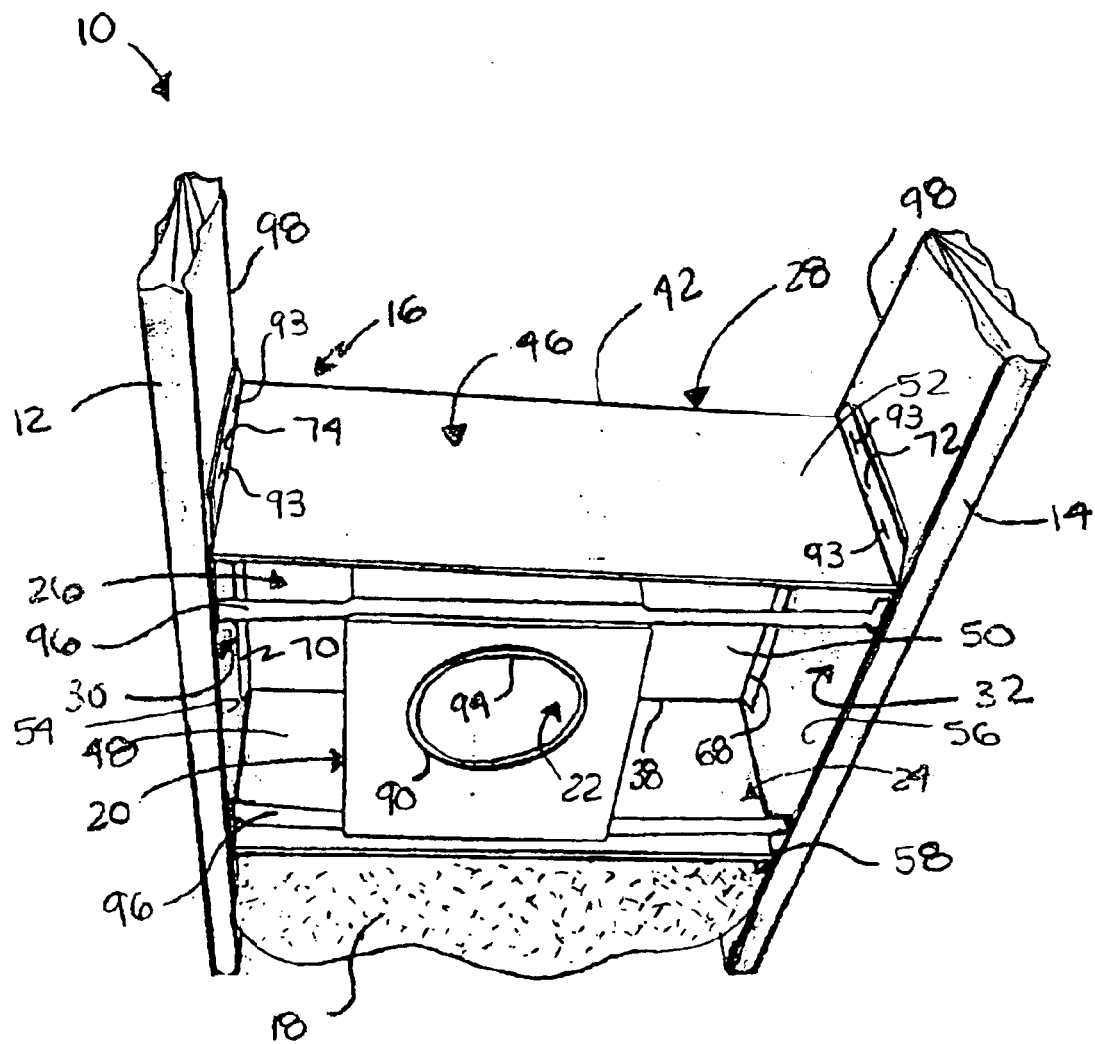
FIG. 1 is a bottom perspective view of the recessed electrical fixture assembly in accordance with an embodiment of the present invention, showing a barrier mounted between support members and substantially enclosing a housing that supports an electrical unit.

Referring to FIGS. 1–5, a recessed electrical fixture assembly 10 in accordance with an embodiment of the present invention is installed between first and second support members 12 and 14, such as joists of a ceiling, and includes a barrier 16 that allows assembly 10 to be employed in ceilings or walls with insulation 18 in close proximity. More specifically, assembly 10 includes a housing 20 supporting an electrical unit 22 and barrier 16 spaces insulation 18 from housing 20, thereby preventing overheating of electrical unit 22 and meeting UL requirements. Electrical unit 22 can be a lighting unit or other electrical fixture, such as a fan. This is particularly useful when electrical unit 22 is a high wattage unit ihat dissipates significantly more heat than low wattage units or is a unit not rated for insulation contact.

Figure 2:
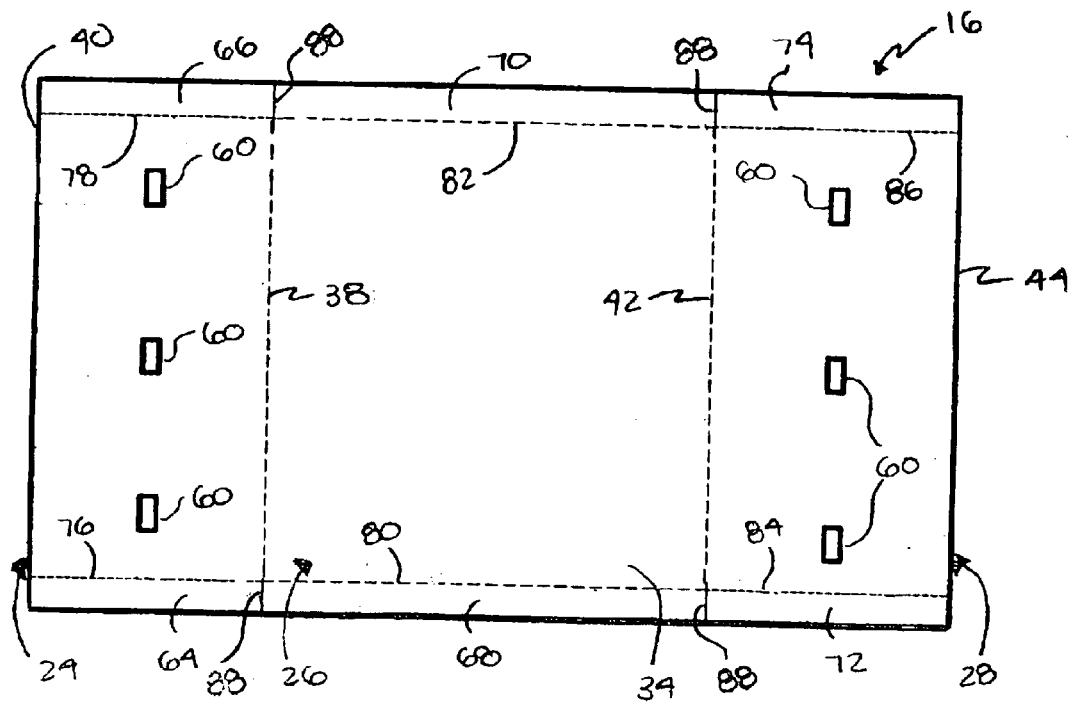
FIG. 2 is a plan view of the barrier in accordance with the embodiment of the present invention illustrated in FIG. 1.
Figure 3:
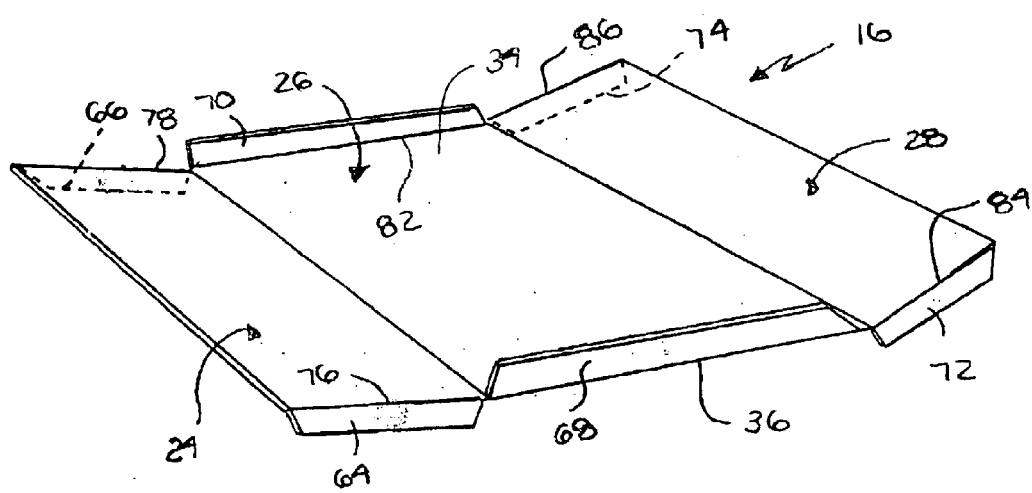
FIG. 3 is a perspective view of the barrier illustrated in FIG. 2, showing foldable end flaps of the barrier.

As seen in FIGS. 1–3, barrier 16 includes foldable first, second and third panels 24, 26 and 28 to facilitate mounting barrier 16 between first and second support members 12 and 14. First and second support members 12 and 14 are generally parallel and include first and second opposing inner surfaces 30 and 32, respectively. Barrier 16 is releasably coupled to inner surfaces 30 and 32 to mount barrier 16 between support members 12 and 14. Barrier 16 is substantially rectangular, generally flat when foldable panels 24, 26 and 28 are unfolded, and includes opposite first and second surfaces 34 and 36. Barrier 16 can be any polygonal or circular shape as long as barrier 16 fits between support member 12 and 14 and spaces insulation 18 from housing 20. First panel 24 is defined between a first score line 38 extending across the width, i.e. transverse longitudinal length, of barrier 16 and a first outer edge 40. Second panel 26 is defined between first score line 38 and a second score line 42 that is substantially parallel to line 38. Third panel 28 is defined between second score line 42 and a second outer edge 44 opposite first edge 40. First and third panels 24 and 28 are foldable toward either first or second surface 34 and 36 with respect to second panel 26. Similarly, second panel 26 is foldable toward either first or second surface 34 and 36 with respect to first and third panels 24 and 28. As seen in FIG. 2, first and third panels 24 and 28 are substantially identical in length and width. Second panel 26 disposed between panels 24 and 28 has generally twice the width of first and third panels 24 and 28 and substantially the same length. Each panel 24, 26 and 28 has a length which is transverse to the longitudinal length of barrier 16 and that is substantially the same as the distance between inner surfaces 30 and 32 of support members 12 and 14, as seen in FIG. 1. Barrier 16 can be formed of heat insulating or non-heat insulating material, for example, corrugated plastic sheeting, PVC sheeting, corrugated fiberboard, fire rated sheeting, aluminum sheet and the like. Barrier 16 is preferably about ⅛ inch thick.

Figure 5:
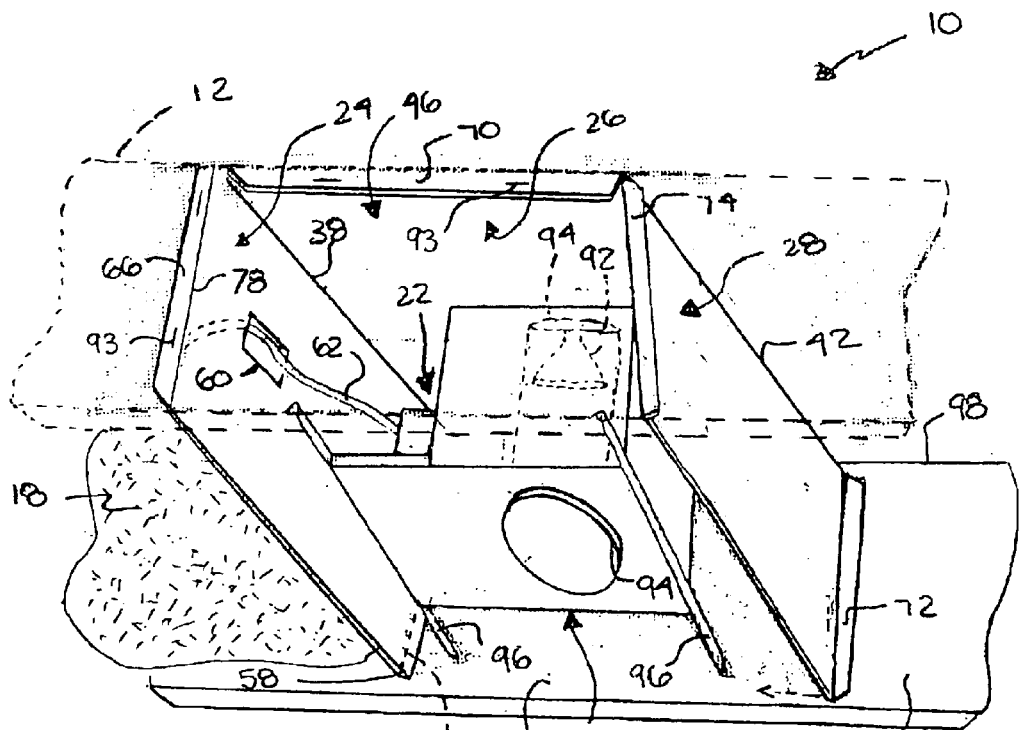
FIG. 5 is bottom perspective view of the recessed electrical fixture assembly illustrated in FIG. 1, showing the housing and electrical unit mounted within the barrier and showing one remaining panel of the barrier being folded into place.

Barrier 16 forms an enclosure 46 when mounted between support members 12 and 14. As seen in FIG. 1, first, second and third panels 24, 26 and 28 form first, second and third sides 48, 50 and 52 of enclosure 46, respectively, and inner surfaces 30 and 32 of support members 12 and 14 form fourth and fifth sides 54 and 56, respectively, at the ends of panels 24, 26 and 28. First and third sides 48 and 52 are generally perpendicular to second side 50. A sixth side 58, opposite side 50 formed by second panel 26, is substantially open to receive housing 20 and electrical unit 22. First surface 34 of barrier 16 forms the inner surface of enclosure 46 and second surface 36 forms the outer surface of enclosure 46. Barrier 16 can have more than three panels to form enclosure 46, thereby eliminating inner surfaces 30 and 32 of support members 12 and 14 and the fourth and fifth sides 54 and 56 of enclosure 46. Perforated knock-outs 60 can be provided in first and third panels 24 and 26 to allow wiring 62 of electrical unit 22 to extend through and outside of enclosure 46, as best seen in FIG. 5. Instructional indicia (not shown) can also be provided on any of panels 24, 26 and 28.

As seen in FIGS. 2 and 3, each of first, second and third panels 24, 26 and 28 of barrier 16 include first and second foldable end flaps 64, 66, 68, 70, 72 and 74, respectively. Each end flap 64, 66, 68, 70, 72 and 74 is defined by an end score line 76, 78, 80, 82, 84 and 86 disposed in respective panels 24, 26 and 28. End score lines 76, 78, 80, 82, 84 and 86 are substantially transverse to first and second score lines 38 and 42 defining panels 24, 26 and 28. Each end flap 64, 66, 68, 70, 72 and 74 is foldable about a respective end score line 76, 78, 80, 82, 84 and 86 towards either first or second surface 34 and 36 of barrier 16 with respect to panels 24, 26 and 28, as seen in FIG. 3. End flaps 64, 66, 68, 70, 72 and 74 are separated by cut lines 88 in barrier 16 extend substantially the width of respective panels 24, 26 and 28.

Figure 4:
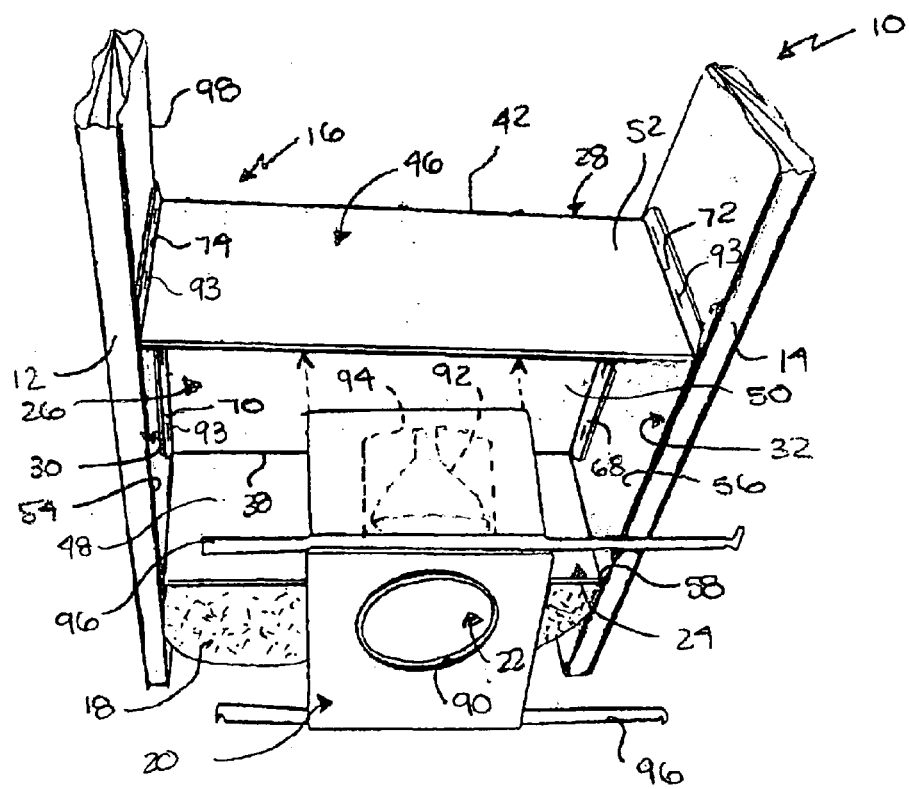
FIG. 4 is a bottom perspective view of the recessed electrical fixture assembly illustrated in FIG. 1, showing the housing and electrical unit being mounted.

A typical housing 20 and electrical unit 22 are described in commonly owned U.S. Pat. No. 6,357,891 to Newbold et al. entitled Fire Assembly For Recessed Light Fixtures, the subject matter of which is hereby incorporated by reference. In general, housing 20 is advantageously box shaped and is formed of a generally fire resistant material, such as plaster or wallboard including for example, sheet rock, plywood, asbestos cement sheets, gypsum plasterboard, laminated plastics, inturnscent material and the like. Housing 20 includes an opening 90 that aligns with or corresponds to open side 58 of barrier enclosure 46. As seen in FIGS. 4 and 5, electrical unit 22 is a lighting unit that is supported within housing 20 and has a reflector 92 supporting a lamp (not shown) that distributes electrical through opening 90. An optional can 94 can be included with electrical unit 22 for supporting reflector 92 and the lamp. Two support bars 96 are coupled to opposite sides of housing 20 to mount housing 20, with electrical unit 22 received therein, to support members 12 and 14, as is known in the art. Housing 20 can also be non-fire resistant or any housing not rated for insulation contact. Electrical unit 22 can be any electrical fixture, such as a fan or exhaust unit.

Assembly of Embodiment of FIGS. 1–5

Referring to FIGS. 1–5, to assemble and mount fire resistant recessed electrical fixture assembly 10, barrier 16 is initially mounted between first and second support members 12 and 14, and housing 20 supporting electrical unit 22 is subsequently mounted between support members 12 and 14 and substantially within enclosure 46 defined by barrier 16. Insulation 18 can then be disposed around barrier 16 outside of enclosure 46, thereby spacing insulation 18 from housing 20 and preventing overheating of housing 20 and electrical unit 22.

Mounting barrier 16 between support members 12 and 14 initially requires folding end flaps 68 and 70 toward first surface 34 of barrier 16 with respect to second panel 26, as seen in FIG. 3. Barrier 16 is then positioned between support members 12 and 14 and end flaps 68 and 70 of second panel 26 are releasably coupled to first and second inner surfaces 30 and 32 of support members 12 and 14, respectively, by any known releasable attachment, such as by stapling, nailing or using adhesive, including, for example, staples 93 shown in FIGS. 1, 4 and 5. Second panel 26 is preferably positioned so that panel 26 is flush with side edges 98 transverse to inner surfaces 30 and 32.

As seen in FIGS. 4 and 5, first and third panels 24 and 28 can then be folded towards first surface 34 of barrier 16 with respect to second panel 26 forming enclosure 46 (see FIG. 5 showing third panel 28 being folded into place). First and second end flaps 64 and 66 are folded towards second surface 36 with respect to first panel 24 and first and second end flaps 72 and 74 are folded towards second surface 36 with respect to third panel 28. Housing 20 with electrical unit 22 is then inserted through open side 58 of enclosure 46 and mounted to inner surfaces 30 and 32 of support members 12 and 14 via support bars 96 by any known attachment, such as staples or nails. With housing 20 and electrical unit 22 substantially received in enclosure 46 and opening 90 corresponding to open side 58 of enclosure 46, end flaps 64, 66, 72 and 74 of first and third panels 24 and 28 are releasably coupled to inner surfaces 30 and 32 of support members 12 and 14 in the same manner as flaps 68 and 70. End flaps 68 and 70 of second panel 26 extend inwardly with respect to enclosure 46 and end flaps 64, 66, 72 and 74 extend outwardly opposite flaps 68 and 70, as best seen in FIGS. 4 and 5. However, end flaps 64, 66, 68, 70, 72 and 74; can fold or extend either inwardly or outwardly with respect to enclosure 46. Alternatively, barrier 16 can be self-supporting, that is without being coupled to support members 12 and 14.

Panels 24, 26 and 28 of barrier 16 are spaced about 3 inches or more from housing 20, allowing insulation 18 to be placed around assembly 10, specifically around barrier 16, with insulation 18 being sufficiently spaced from housing 20 and electrical unit 22 to prevent overheating. A conventional thermal sensor (not shown) of electrical unit 22, set to UL requirements for heat dissipation of recessed electrical units, will switch electrical unit 22 off if the heat dissipation exceeds UL standards. Barrier 16 maintains appropriate heat levels, particularly for higher wattage electrical units, by forming and maintaining the space between housing 20 and insulation 18. Without the space between barrier 16 and housing 20, insulation 18 would overheat housing 20 and electrical unit 22 causing the thermal sensor to deactivate electrical unit 22. With barrier 16, housing 20 and its electrical unit 22 can be installed in ceilings or walls with insulation instead of without insulation and avoid overheating and deactivation by the thermal sensor.

Figure 6:
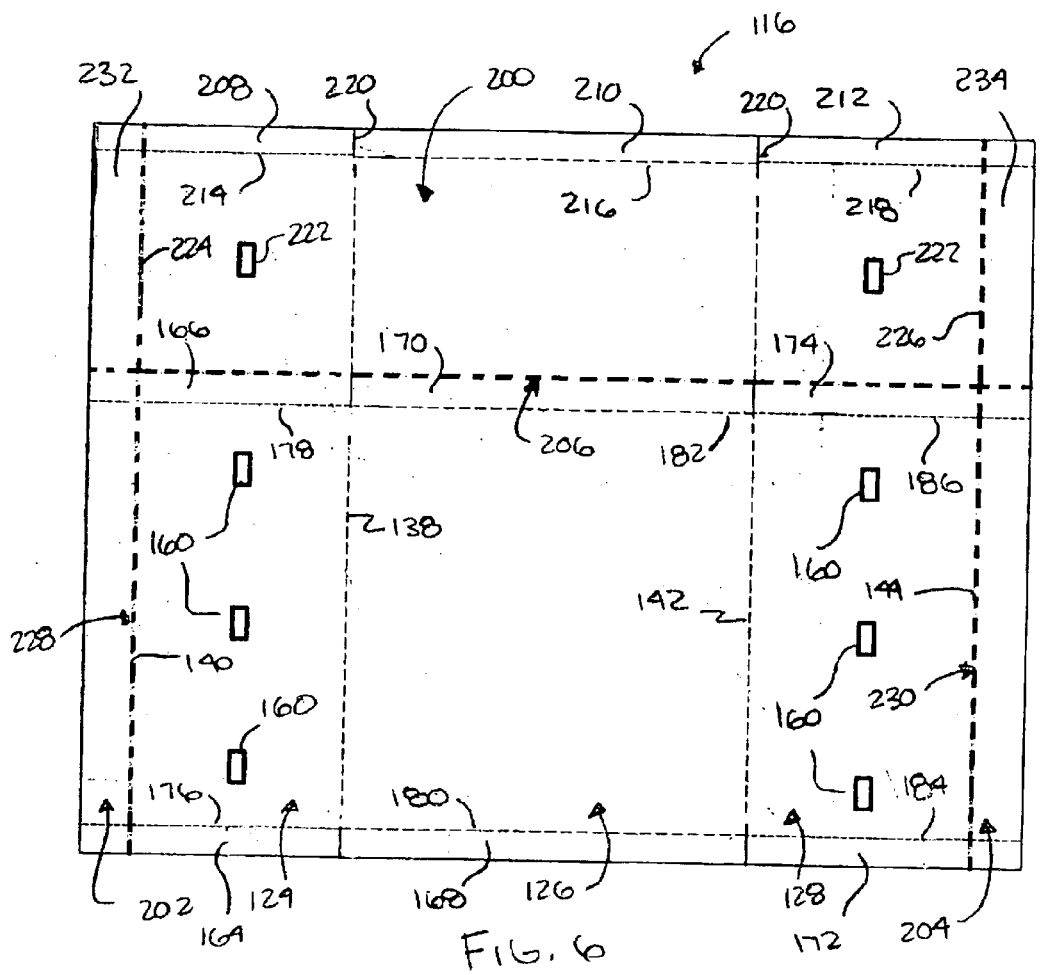
FIG. 6 is a plan view of a barrier in accordance with another embodiment of the present invention.

Embodiment of FIG. 6

Referring to FIG. 6, a barrier 116 in accordance with another embodiment of the present invention is substantially similar to barrier 16 of the first embodiment of fire resistant recessed electrical fixture assembly 10, except for barrier 116 is adjustable to the distance between first and second support members 12 and 14 and to the size of housing 20 supporting electrical unit 22. More specifically, barrier 116 includes first, second and third tear away sections 200, 202 and 204, that allow the installer to adjust the length and width of barrier 116.

Like barrier 16 of the first embodiment, barrier 116 includes first, second and third panels 124, 126 and 128 defined by first and second score lines 138 and 142. Each panel 124, 126 and 128 has first and second foldable end flaps 164, 166, 168, 170, 172 and 174, respectively. Each end flap 164, 166, 168, 170, 172 and 174 is defined by an end score line 176, 178, 180, 182, 184 and 186 which are separated by cut lines 188. End score lines 176, 178, 180, 182, 184 and 186 are substantially transverse to first and second score lines 138 and 142 defining panels 124, 126 and 128.

First tear away section 200 extends from second end flaps 166, 170, and 174 of panels 124, 126 and 128, thereby increasing the length of first, second and third panels 124, 126 and 128. A first perforated line 206 is disposed between second end flaps 166, 170 and 174 and first tear away section 200. First perforated line 206 is generally parallel to end score lines 176, 178, 180, 182, 184 and 186. First and second score lines 138 and 142 extend into first tear away section 200, allowing first tear away section 200 to fold as first, second and third panels 124, 126 and 128 are folded. First tear away section 200 is provided with first, second and third foldable end flaps 208, 210 and 212 extending from section 200 opposite first perforated line 206. End flaps 208, 210 and 212 are foldable about respective end score lines 214, 216 and 218 and are separated by cut lines 220. First tear away section 200 can also include knock-outs 222 aligned with knock-outs 160 of panels 124 and 128.

Second and third tear away sections 202 and 204 extend from a first outer edge 140 of first panel 124 and a second outer edge 144 of third panel 128, respectively, thereby increasing the width of panels 124 and 128. Second and third tear away sections 202 and 204 also extend from opposite edges 224 and 226 of first tear away section 200. Second and third perforated lines 228 and 230 are disposed between first and third panels 124 and 128 and second and third tear away sections 202 and 204 and between edges 224 and 226 of first tear away section 200 and second and third tear away sections 202 and 204. End score line 176 of first panel 124 and end score line 184 of third panel 128 extend into second and third sections 202 and 204, respectively, allowing second and third sections 202 and 204 to fold when end flaps 164 and 172 are folded. Similarly, end score line 178 of first panel 124 and end score line 186 of third panel 128 extend into second and third sections 202 and; 204, respectively, allowing second and third sections 202 and 204 to fold when end flaps 166 and 174 are folded. Also, first perforated line 206 of first section 200 extends into second and third sections 202 and 204 and end score lines 214 and 218 of first section 200 extend into second and third sections 202 and 204, respectively.

Barrier 116 is mounted between first and second support members 12 and 14 in the same manner as described above with respect to barrier 16 of the first embodiment, except first, second and third tear away sections 200, 202 and 204 can be removed to adjust the width and length of barrier 116 depending on the size of housing 20 and electrical unit 22 and the distance between first and second support members 12 and 14. If for example a larger barrier is required, that is to accommodate a larger housing 20, larger support members and wider spaced support members 12 and 14, then barrier 116 can be mounted without removing sections 200, 202 and 204. In that case, end flaps 208, 210 and 212 of first section 200 would be releasably coupled to first inner surface 30 of first support member 12 and end flaps 164, 168 and 172 of panels 124, 126 and 128, respectively, would be releasably coupled to second inner surface 32 of second support member to form enclosure 46 around housing 20. Similarly, second and third tear away sections 202 and 204 can be removed to adjust the length of barrier 116 but not the width with end flaps by separating second third sections 202 and 204 at second and third perforated lines 228 and 230. Alternatively, first tear way section 200 can be removed by separating section 200 from end flaps 166, 170 and 174 at first perforated line 206 to adjust the width of barrier 116, that is transverse to longitudinal length of barrier 116, but not adjusting the length of barrier 116. In that case, first and second end flaps 164, 166, 168, 170, 172 and 174 are releasably coupled to inner surfaces 30 and 32 of support members 12 and 14 as described above with respect to barrier 16. Portions 232 and 234 of second and third tear away sections 202 and 204 adjacent first section 200 would also be removed, leaving the width of barrier 116, substantially equal to barrier 16 of the first embodiment. The length of barrier 116 would be longer than barrier 16 by portions 236 and 238 of second and third sections 202 and 204 which remain adjacent first and third panels 124 and 128 of barrier 116. First, second and third tear away sections 200, 202 and 206 can be removed individually or in any combination to provide the appropriate adjustment for the size of housing 20 and electrical unit 22, the size of support members 12 and 14 and the distance between support members 12 and 14.

While particular embodiments have been chosen to illustrate the invention, it will be understood by those skilled in the art that various changes and modifications can be made therein without departing from the scope of the invention as defined in the appended claims.

What is claimed is:

1. A recessed electrical fixture assembly, comprising:

first and second support members, said first and second support members being spaced and substantially parallel, and including first and second inner surfaces, respectfully, said first and second inner surfaces opposing one another, a barrier releasably coupled to said first and second inner surfaces of said first and second support members and defining an enclosure with at least one open side;

a fire resistant housing at least partially received in said enclosure defined by said barrier and releasably coupled to said first and second support members, said fire resistant housing including an opening corresponding to said open side of said enclosure; and an electrical unit received in said fire resistant housing.

2. A recessed electrical fixture assembly according to claim 1, wherein said barrier includes first, second and third foldable panels that extend between said first and second support members, thereby defining said enclosure; and said second foldable panel extends between said first and third foldable panels.

3. A recessed electrical fixture assembly according to claim 2, wherein said second foldable panel is opposite said open side.

4. A recessed electrical fixture assembly according to claim 2, wherein said first and third foldable panels are substantially parallel; and said second foldable panel is substantially perpendicular to each of said first and third foldable panels.

5. A recessed electrical fixture assembly according to claim 2, wherein each of said first, second and third foldable panels includes opposing first and second foldable end flaps.

6. A recessed electrical fixture assembly according to claim 5, wherein said first foldable end flaps of each of said first, second and third foldable panels are releasably coupled to said first inner surface of said first support member; and said second foldable end flaps of each of said first, second and third foldable panels are releasably coupled to said second inner surface of said second support member.

7. A recessed electrical fixture assembly according to claim 5, wherein said foldable end flaps are substantially perpendicular to their respective first, second and third foldable panels.

8. A recessed electrical fixture assembly according to claim 5, wherein said foldable end flaps of said first and third foldable panels, respectively, extend outside of said enclosure; and said foldable end flaps of said second foldable panel extend inside of said enclosure.

9. A recessed electrical fixture assembly according to claim 5, wherein each of said first and third foldable panels includes at least one knock-out for receiving wiring from said electrical unit.

10. A recessed electrical fixture assembly according to claim 1, wherein said barrier includes no more than first, second and third foldable panels with each of said foldable panels including no more than first and second foldable end flaps.

11. A recessed electrical fixture assembly according to claim 1, wherein said fire resistant housing is releasably coupled to said first and second inner surfaces of said support members.

12. A recessed electrical fixture assembly according to claim 1, wherein said barrier is formed of a plastic material; and said barrier engages insulation outside of said enclosure.

13. A recessed electrical fixture assembly according to claim 1, wherein said barrier is adjustable.

14. A recessed electrical fixture assembly according to claim 1, wherein said fire resistant housing is formed of wallboard.

15. A recessed electrical fixture assembly according to claim 1, wherein said first and second support members are first and second joists, respectively.

16. A recessed electrical fixture assembly according to claim 1, wherein said electrical unit is a lighting unit including a reflector and a lamp.

17. A recessed electrical fixture assembly, comprising:

first and second support members, said first and second support members being spaced and substantially parallel, and including first and second inner surfaces, respectfully, said first and second inner surfaces opposing one another;

a barrier including first, second and third foldable panels extending between said first and second support members, each of said foldable panels includes first and second foldable end flaps, and each of said first foldable end flaps being releasably coupled to said first inner surface of said first support member and each of said second foldable end flaps being releasably coupled to said second inner surface of said second support member, said first, second and third panels and said first and second inner surfaces of said first and second support members defining an enclosure with at least one open side;

a housing at least partially received in said enclosure and releasably coupled to said first and second support members, said housing including an opening corresponding to said open side of said enclosure; and an electrical unit received in said housing.

18. A recessed electrical fixture assembly according to claim 17, wherein each of said first and second foldable end flaps is substantially perpendicular to their respective first, second and third foldable panels.

19. A recessed electrical fixture assembly according to claim 17, wherein said foldable end flaps of said first and third foldable panels, respectively, extend outside of said enclosure; and said foldable end flaps of said second foldable panel extend inside of said enclosure.

20. A recessed electrical fixture assembly according to claim 17, wherein said housing is releasably coupled to said first and second inner surfaces of said first and second support members.

21. A recessed electrical fixture assembly according to claim 17, wherein said barrier engages insulation outside of said enclosure.

22. A recessed electrical fixture assembly according to claim 17, wherein said barrier is formed of a plastic material.

23. A recessed electrical fixture assembly according to claim 17, wherein said electrical unit is a lighting unit including a reflector and a lamp.

24. A method of installing a recessed electrical fixture, comprising the steps of:

positioning a barrier between first and second support members, the first and second support members being spaced and substantially parallel with respect to one another and defining opposing inner surfaces;

releasably coupling the barrier to each of the inner surfaces of the first and second support members, thereby defining an enclosure with at least one side being open;

inserting a fire resistance housing for supporting an electrical unit into the enclosure through the open side of the barrier; and releasably coupling the housing to the first and second support members using support bars.

25. A method according to claim 24, further comprising the step of providing an insulating material outside of the enclosure.

26. A method according to claim 24, wherein the barrier includes first, second and third foldable panels with each of the panels having first and second foldable end flaps.

27. A method according to claim 26, further comprising the step of folding the first and third foldable panels to position the barrier between the first and second support members, thereby defining the enclosure.

28. A method according to claim 27, further comprising the step of folding the first and second foldable end flaps of the second foldable panel in a first direction; and folding the first and second foldable end flaps of each of the first and third foldable panels in a second direction that is substantially opposite to said first direction.

29. A method according to claim 28, further comprising the step of releasably coupling the barrier to the first and second inner surfaces of the support members by releasably coupling the first and second foldable end flaps of the second foldable panel to the first and second inner surfaces, respectfully.

30. A method according to claim 28, further comprising the step of releasably coupling the barrier to the first and second inner surfaces of the support members by releasably coupling the first and second foldable end flaps of each of the first and third foldable panels to the first and second inner surfaces, respectfully.

31. A method according to claim 30, further comprising the step of inserting the fire resistant housing into the enclosure prior to releasably coupling the first and second foldable end flaps of each of the first and third foldable panels to the first and second inner surfaces, respectfully.

32. A method according to claim 24, further comprising the step of inserting an electrical unit in the fire resistant housing prior to inserting the fire resistant housing into the enclosure.

33. A method according to claim 24, further comprising the step of releasably coupling the fire resistant housing to the inner surfaces of the first and second support members.

34. A method according to claim 24, wherein the barrier includes no more than first, second and third foldable panels with each of the panels having no more than first and second foldable end flaps.

35. A method according to claim 24, wherein said barrier is formed of a plastic material.

36. A method according to claim 24, wherein said first and second support members are first and second joists, respectfully.

* * * * *